(12) United States Patent
Nakano et al.

(10) Patent No.: US 10,759,901 B2
(45) Date of Patent: Sep. 1, 2020

(54) THERMALLY DECOMPOSABLE BINDER

(71) Applicants: NATIONAL UNIVERSITY CORPORATION TOKYO UNIVERSITY OF AGRICULTURE AND TECHNOLOGY, Tokyo (JP); SUMITOMO SEIKA CHEMICALS CO., LTD., Kako-gun, Hyogo (JP)

(72) Inventors: Koji Nakano, Fuchu (JP); Kiyoshi Nishioka, Kobe (JP); Masahiro Suzuki, Himeji (JP); Nobutaka Fujimoto, Akashi (JP)

(73) Assignees: NATIONAL UNIVERSITY CORPORATION TOKYO UNIVERSITY OF AGRICULTURE AND TECHNOLOGY, Fuchu-Shi (JP); SUMITOMO SEIKA CHEMICALS CO., LTD., Hyogo (JP)

( * ) Notice: Subject to any disclaimer, the term of this patent is extended or adjusted under 35 U.S.C. 154(b) by 36 days.

(21) Appl. No.: 15/552,395

(22) PCT Filed: Sep. 2, 2015

(86) PCT No.: PCT/JP2015/074937
§ 371 (c)(1),
(2) Date: Aug. 21, 2017

(87) PCT Pub. No.: WO2016/139831
PCT Pub. Date: Sep. 9, 2016

(65) Prior Publication Data
US 2018/0030203 A1   Feb. 1, 2018

(30) Foreign Application Priority Data
Mar. 2, 2015   (JP) .................. 2015-040238

(51) Int. Cl.
| C08G 64/02 | (2006.01) |
| C08G 64/34 | (2006.01) |
| C08G 64/42 | (2006.01) |
| C08K 3/00 | (2018.01) |
| C08K 3/08 | (2006.01) |
| C08L 69/00 | (2006.01) |

(52) U.S. Cl.
CPC ......... *C08G 64/0208* (2013.01); *C08G 64/02* (2013.01); *C08G 64/34* (2013.01); *C08G 64/42* (2013.01); *C08K 3/00* (2013.01); *C08K 3/08* (2013.01); *C08L 69/00* (2013.01); *C08K 2003/0806* (2013.01)

(58) Field of Classification Search
CPC .... C08G 64/0208; C08G 64/02; C08G 64/42; C08G 64/34; C08K 3/00; C08K 3/08; C08K 2003/0806; C08L 69/00
See application file for complete search history.

(56) References Cited

U.S. PATENT DOCUMENTS

| 8,927,680 | B2 | 1/2015 | Morishita et al. |
| 2007/0187656 | A1 | 8/2007 | Evans et al. |
| 2013/0281633 | A1 | 10/2013 | Allen |
| 2014/0008588 | A1 | 1/2014 | Fujimoto et al. |
| 2014/0072806 | A1 | 3/2014 | Allen et al. |
| 2016/0095933 | A1 | 4/2016 | Coady et al. |

(Continued)

FOREIGN PATENT DOCUMENTS

| CN | 101384629 A | 3/2009 |
| CN | 103562264 A | 2/2014 |
| CN | 103732650 A | 4/2014 |

(Continued)

OTHER PUBLICATIONS

Cupta et al., "Photoacid Generators for Catalytic Decomposition of Polycarbonate", Journal of Applied Polymer Science, vol. 105, 2007, pp. 2655-2662.*

(Continued)

*Primary Examiner* — Patrick D Niland
(74) *Attorney, Agent, or Firm* — Birch, Stewart, Kolasch & Birch, LLP

(57) ABSTRACT

A thermally decomposable binder containing an aliphatic polycarbonate resin containing a constituting unit represented by the formula (1):

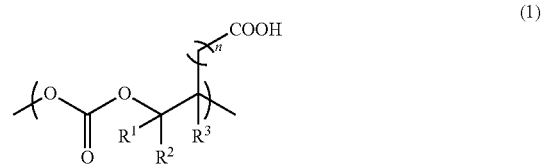

(1)

wherein each of $R^1$, $R^2$ and $R^3$, which may be identical or different, is a hydrogen atom, an alkyl group having from 1 to 10 carbon atoms, or an aryl group having from 6 to 20 carbon atoms; and n is 1 or 2. The thermally decomposable binder and the fine inorganic particle-dispersed paste composition, each containing an aliphatic polycarbonate resin of the present invention can be used in general molded articles, optical materials such as films, fibers, optical fibers, and optical disks, thermally decomposable materials such as ceramic binders, and lost foam casting, medicinal materials such as drug capsules, additives for biodegradable resins, main components for biodegradable resins, and the like.

11 Claims, 1 Drawing Sheet

(56) References Cited

U.S. PATENT DOCUMENTS

2018/0030203 A1 2/2018 Nakano et al.

FOREIGN PATENT DOCUMENTS

| CN | 105348505 A | 2/2016 |
|---|---|---|
| EP | 2 716 679 A1 | 4/2014 |
| JP | 5-24934 A | 2/1993 |
| JP | 2008-285545 A | 11/2008 |
| JP | 2011-178606 A | 9/2011 |
| JP | 2014-9282 A | 1/2014 |
| JP | 2014-503018 A | 2/2014 |
| JP | 2014-514429 A | 6/2014 |
| JP | 2014-185260 A | 10/2014 |
| JP | 5781939 B2 | 9/2015 |
| WO | WO 2004/042797 A2 | 5/2004 |
| WO | 2010-106286 A | 5/2010 |
| WO | WO 2010/075232 A1 | 7/2010 |
| WO | WO 2011/101395 A1 | 8/2011 |
| WO | WO 2012/128028 A1 | 9/2012 |
| WO | WO 2016/139831 A1 | 9/2016 |
| WO | WO 2017/170079 A1 | 10/2017 |
| WO | WO 2019/045092 A1 | 3/2019 |

OTHER PUBLICATIONS

Office Action with Search Report dated Dec. 27, 2018, in Chinese Patent Application No. 201580077337.5.
Extended European Search Report dated Aug. 1, 2018, in European Patent Application No. 15883997.7.
Liu et al., "Synthesis and Properties of Functional Aliphatic Polycarbonates," Journal of Polymer Science: Part A: Polymer Chemistry (Dec. 15, 2003), vol. 41, No. 24, pp. 4001-4006.
International Search Report (PCT/ISA/210) issued in PCT/JP2017/011593, dated Jun. 20, 2017.
Song et al., "Synthesis and characterization of amino-functionalized poly(propylene carbonate)", RSC Advances (2015), vol. 5, No. 41, pp. 32092-32095.
Written Opinion (PCT/ISA/237) issued in PCT/JP2017/011593, dated Jun. 20, 2017.
Darensbourg et al., "Aliphatic Polycarbonates Produced from the Coupling of Carbon Dioxide and Oxetanes and Their Depolymerization via Cyclic Carbonate Formation," Macromolecules (2011), vol. 44 No. 8, pp. 2568-2576.
International Search Report, issued in PCT/JP2015/074937, dated Nov. 24, 2015, with English translation.
Written Opinion of the International Searching Authority, issued in PCT/JP2015/074937, dated Nov. 24, 2015, with English translation.
U.S. Office Action, dated Nov. 21, 2019, for U.S. Appl. No. 16/089,839.
U.S. Appl. No. 16/644,120, filed Mar. 3, 2020.
U.S. Notice of Allowance, dated Feb. 4, 2020, for U.S. Appl. No. 16/089,839.
Zhang et al., "A Water-Soluble Polycarbonate with Dimethylamino Pendant Groups Prepared by Enzyme-Catalyzed Ring-Opening Polymerization," Macromolecular Rapid Communications, vol. 33, 2012, pp. 693-697.
U.S. Appl. No. 16/089,839, filed Sep. 28, 2018.

* cited by examiner

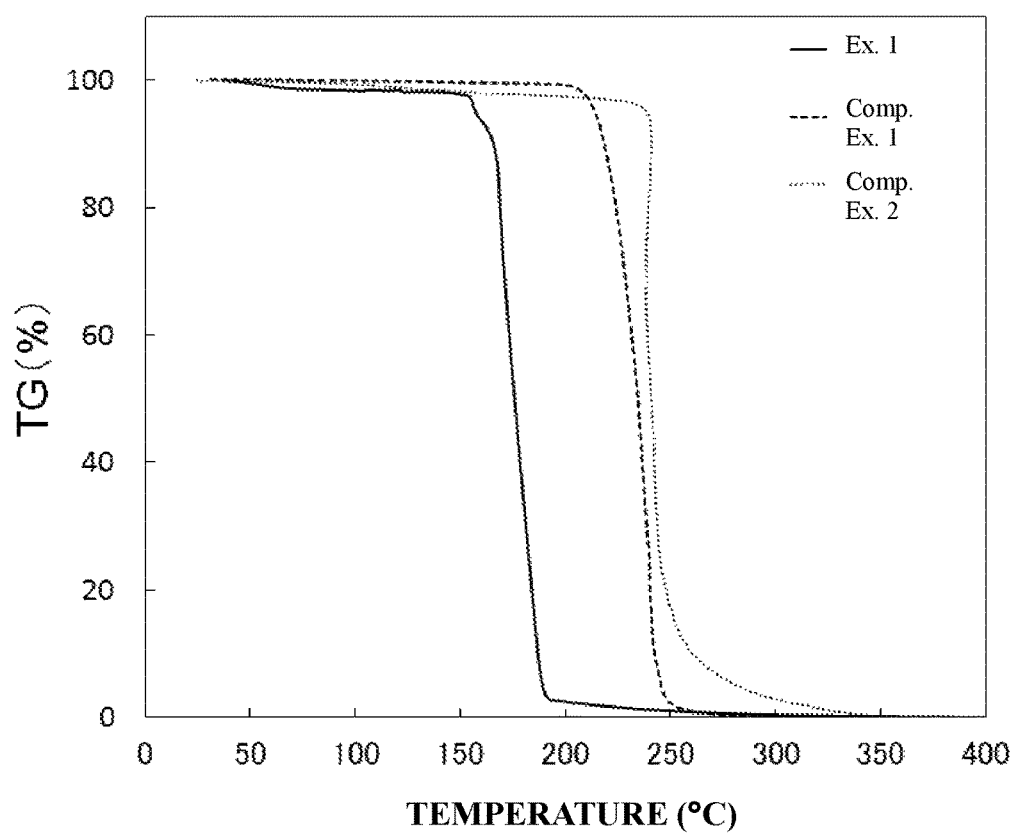

THERMALLY DECOMPOSABLE BINDER

TECHNICAL FIELD

The present invention relates to a thermally decomposable binder containing an aliphatic polycarbonate resin and a fine inorganic particle-dispersed paste composition.

BACKGROUND ART

In recent years, fine inorganic particle-dispersed paste compositions in which fine inorganic particles of electroconductive particles, ceramics, glass, a phosphor or the like are dispersed in a binder resin have been used for obtaining sintered bodies of various shapes. For example, a paste composition in which fine metal particles are dispersed as electroconductive particles has been used in formation of circuits or the like on a substrate, a glass paste in which glass is dispersed or a phosphor paste in which phosphor is dispersed has been used in production of plasma display panels, a ceramic paste in which ceramics are dispersed has been molded into a green sheet, and then used in the production of a multilayer ceramic capacitor or the like.

Conventionally, as binder resins, ethyl cellulose, polyvinyl butyral, poly(methyl methacrylate) and the like have been used, and in these binder resins a degreasing temperature for removal by thermal decomposition is as high as 300° C. or higher in the production of a molded article, and the residual carbon is in a large amount, so that enormous energy is required in the production. Further, when fine inorganic particles unwantedly reacting with oxygen are handled, it is preferable that degreasing is carried out in a non-oxidative atmosphere, in which case a temperature required for degreasing would be at an even higher temperature. In view of the above, a binder resin capable of degreasing at a lower temperature even in a non-oxidative atmosphere, as in an oxidative atmosphere is desired.

In order to meet such demands, a polycarbonate resin produced from carbon dioxide and an epoxide has a low decomposition temperature of from 200° to 250° C. even in a non-oxidative atmosphere, and this polycarbonate resin has been studied to be used as a low-temperature decomposable binder. For example, Patent Publication 1 discloses a metal paste composition in which a polypropylene carbonate, which is one of aliphatic polycarbonates, is used as a binder, and similarly, Patent Publication 2 discloses a ceramic paste, and Patent Publication 3 discloses a glass paste.

PRIOR ART REFERENCES

Patent Publications

Patent Publication 1: WO 2012/128028
Patent Publication 2: Japanese Patent Laid-Open No. Hei-5-24934
Patent Publication 3: Japanese Patent Laid-Open No. 2011-178606

SUMMARY OF THE INVENTION

Problems to be Solved by the Invention

However, there are increasing demands on conservation of energy in recent years. Also, for example, when a circuit is tried to be formed by using a metal paste on a plastic substrate, there are some disadvantages that a heat-resistant temperature of a plastic substrate is even lower than a decomposition temperature of a binder resin, so that a circuit cannot be formed.

Accordingly, an object of the present invention is to provide a thermally decomposable binder and a fine inorganic particle-dispersed paste composition, each containing an aliphatic polycarbonate resin thermally decomposable at an even lower temperature.

Means to Solve the Problem

As a result of intensive studies in order to solve the above problems, the present inventors have found that an aliphatic polycarbonate resin having a specified carboxy group in a side chain has a property of decomposing in an amount of 90% by mass or more at 160° C., and as a result of even more intensive studies, they have found that if this aliphatic polycarbonate resin is used as a thermally decomposable binder, sufficient degreasing can be carried out even at a sintering temperature of 160° C. or lower, and the present invention has been perfected thereby.

The present invention relates to:

[1] a thermally decomposable binder containing an aliphatic polycarbonate resin containing a constituting unit represented by the formula (1):

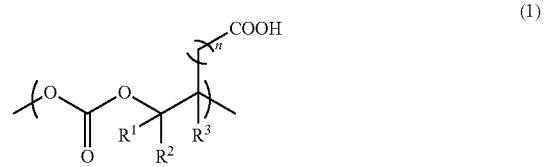

wherein each of $R^1$, $R^2$ and $R^3$, which may be identical or different, is a hydrogen atom, an alkyl group having from 1 to 10 carbon atoms, or an aryl group having from 6 to 20 carbon atoms; and n is 1 or 2;

[2] a fine inorganic particle-dispersed paste composition containing an aliphatic polycarbonate resin containing a constituting unit represented by the formula (1):

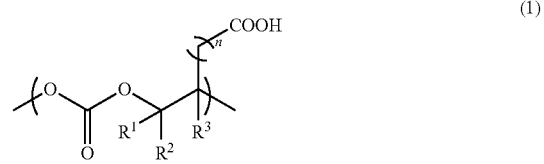

wherein each of $R^1$, $R^2$ and $R^3$, which may be identical or different, is a hydrogen atom, an alkyl group having from 1 to 10 carbon atoms, or an aryl group having from 6 to 20 carbon atoms; and n is 1 or 2, fine inorganic particles, and a solvent; and

[3] an aliphatic polycarbonate resin containing a constituting unit represented by the formula (1):

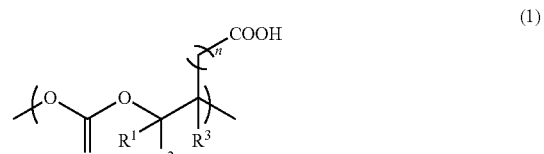

wherein each of $R^1$, $R^2$ and $R^3$, which may be identical or different, is a hydrogen atom, an alkyl group having from 1 to 10 carbon atoms, or an aryl group having from 6 to 20 carbon atoms; and n is 1 or 2.

Effects of the Invention

Since the aliphatic polycarbonate resin contained in the thermally decomposable binder of the present invention can be degreased even at a low temperature, there are some effects of not only making it possible for substantial conservation of energy, but also making it possible for sintering on a resin substrate having a low heat resistance. In addition, since the above aliphatic polycarbonate resin can be degreased even in a non-oxidative atmosphere, the aliphatic polycarbonate resin can be mixed with fine inorganic particles to be used as a fine inorganic particle-dispersed paste.

BRIEF DESCRIPTION OF THE DRAWINGS

FIG. 1 is a TG-DTA curve of aliphatic polycarbonate resins obtained in Example 1, Comparative Example 1 and Comparative Example 2.

MODES FOR CARRYING OUT THE INVENTION

The thermally decomposable binder of the present invention contains an aliphatic polycarbonate resin containing a constituting unit represented by the formula (1):

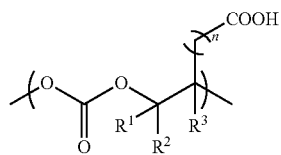

(1)

wherein each of $R^1$, $R^2$ and $R^3$, which may be identical or different, is a hydrogen atom, an alkyl group having from 1 to 10 carbon atoms, or an aryl group having from 6 to 20 carbon atoms; and n is 1 or 2.
The constituting unit represented by the formula (1) has a carboxy group bound to a methylene group or an ethylene group in a side chain, thereby realizing decomposition of the aliphatic polycarbonate resin at a low temperature.

In the formula (1), the number of carbon atoms of the alkyl group is from 1 to 10, and preferably from 1 to 4. The alkyl group is preferably a linear or branched, substituted or unsubstituted alkyl group, including, for example, a methyl group, an ethyl group, an n-propyl group, an isopropyl group, an n-butyl group, a sec-butyl group, a tert-butyl group, an n-pentyl group, an n-hexyl group, an n-heptyl group, an n-octyl group, an n-nonyl group, an n-decyl group, and the like. The alkyl group may be substituted with, for example, one or more substituents selected from an alkoxy group, an ester group, a silyl group, a sulfanyl group, a cyano group, a nitro group, a sulfo group, a formyl group, an aryl group, a halogen atom, and the like.

In addition, the number of carbon atoms of the aryl group is from 6 to 20, and preferably from 6 to 14. The aryl group includes, for example, a phenyl group, an indenyl group, a naphthyl group, a tetrahydronaphthyl group, and the like. The aryl group may be substituted with, for example, one or more substituents selected from alkyl groups such as a methyl group, an ethyl group, an n-propyl group, an isopropyl group, an n-butyl group, a sec-butyl group, and a tert-butyl group, other aryl groups such as a phenyl group and a naphthyl group, an alkoxy group, an ester group, a silyl group, a sulfanyl group, a cyano group, a nitro group, a sulfo group, a formyl group, a halogen atom, and the like.

The aliphatic polycarbonate resin of the present invention may be constituted only by the constituting unit represented by the formula (1), and it is preferable that the aliphatic polycarbonate resin contains, in addition to the constituting unit represented by the formula (1), a constituting unit represented by the formula (2):

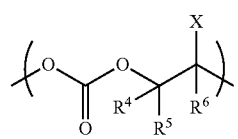

(2)

wherein each of $R^4$, $R^5$, and $R^6$, which may be identical or different, is a hydrogen atom, an alkyl group having from 1 to 10 carbon atoms, or an aryl group having from 6 to 20 carbon atoms; X is a hydrogen atom, an alkyl group having from 1 to 10 carbon atoms, a haloalkyl group having from 1 to 10 carbon atoms, an ether bond-containing group, an ester bond-containing group, or an allyl group.

In the formula (2), the number of carbon atoms of the alkyl group is from 1 to 10, and preferably from 1 to 4. The alkyl group is preferably a linear or branched, substituted or unsubstituted alkyl group, including, for example, a methyl group, an ethyl group, an n-propyl group, an isopropyl group, an n-butyl group, a sec-butyl group, a tert-butyl group, an n-pentyl group, an n-hexyl group, an n-heptyl group, an n-octyl group, an n-nonyl group, an n-decyl group, and the like. The alkyl group may be substituted with, for example, one or more substituents selected from an alkoxy group, an ester group, a silyl group, a sulfanyl group, a cyano group, a nitro group, a sulfo group, a formyl group, an aryl group, a halogen atom, and the like.

In addition, the number of carbon atoms of the aryl group is from 6 to 20, and preferably from 6 to 14. The aryl group includes, for example, a phenyl group, an indenyl group, a naphthyl group, a tetrahydronaphthyl group, and the like. The aryl group may be substituted with, for example, one or more substituents selected from alkyl groups such as a methyl group, an ethyl group, an n-propyl group, an isopropyl group, an n-butyl group, a sec-butyl group, and a tert-butyl group, other aryl groups such as a phenyl group and a naphthyl group, an alkoxy group, an ester group, a silyl group, a sulfanyl group, a cyano group, a nitro group, a sulfo group, a formyl group, a halogen atom, and the like.

In the formula (2), X is a hydrogen atom, an alkyl group having from 1 to 10 carbon atoms, a haloalkyl group having from 1 to 10 carbon atoms, an ether bond-containing group, an ester bond-containing group, or an allyl group, and X is preferably a hydrogen atom or an alkyl group having from 1 to 4 carbon atoms, and more preferably a hydrogen atom or a methyl group.

The number of carbon atoms of the alkyl group represented by X is from 1 to 10, and preferably from 1 to 4. The alkyl group includes a methyl group, an ethyl group, an n-propyl group, and the like.

The number of carbon atoms of the haloalkyl group is from 1 to 10, and preferably from 1 to 4. The haloalkyl group includes a fluoromethyl group, a chloromethyl group, a bromomethyl group, an iodomethyl group and the like.

The ether bond-containing group is preferably an alkyl group having from 1 to 4 carbon atoms substituted with an alkoxy group having from 1 to 4 carbon atoms, an allyloxy group or the like, including a methoxymethyl group, an ethoxymethyl group, an allyloxymethyl group, and the like.

The ester bond-containing group is preferably an alkyl group having from 1 to 4 carbon atoms substituted with an acyloxy group having from 1 to 4 carbon atoms, a benzyloxycarboxy group, or the like, including an acetoxymethyl group, a butyroxymethyl group and the like.

The method for producing an aliphatic polycarbonate resin includes a method including subjecting an epoxide and carbon dioxide to a polymerization reaction in the presence of a metal catalyst, and the like.

The epoxide usable for forming a constituting unit represented by the formula (1) is, but not particularly limited to, preferably one in which a carboxy group is protected with a protective group such as an alkyl group having from 1 to 10 carbon atoms, an aralkyl group having from 7 to 20 carbon atoms, an allyl group, or a trioxabicyclo[2,2,2]octyl group, including, for example, 2-oxiranylmethyl acetate, 3-oxiranylmethyl propionate, 2-oxiranylbenzyl acetate, 3-oxiranylbenzyl propionate, 2-oxiranylallyl acetate, 3-oxiranylallyl propionate, 2-oxiranyl tert-butyl acetate, 3-oxiranyl tert-butyl propionate, 2-oxiranyl trioxabicyclo[2,2,2]octyl acetate, 3-oxiranyl trioxabicyclo[2,2,2]octyl propionate, and the like. These epoxides are copolymerized with carbon dioxide to give a precursor of a carboxy group-containing an aliphatic polycarbonate resin in which the carboxy group is protected, and thereafter subjecting to an appropriate deprotection reaction, thereby giving an aliphatic polycarbonate resin having a constituting unit represented by the formula (1). Among them, a method in which 2-oxiranylbenzyl acetate is used as an epoxide, and deprotection is carried out by a hydrogenation reaction is preferred, from the viewpoint of easiness in synthesis.

The epoxide usable for forming a constituting unit represented by the formula (2) includes, for example, ethylene oxide, propylene oxide, 1-butene oxide, 2-butene oxide, isobutylene oxide, 1-pentene oxide, 2-pentene oxide, 1-hexene oxide, 1-octene oxide, 1-dodecene oxide, cyclopentene oxide, cyclohexene oxide, styrene oxide, vinylcyclohexane oxide, 3-phenylpropylene oxide, 3,3,3-trifluoropropylene oxide, 3-naphthylpropylene oxide, 3-phenoxypropylene oxide, 3-naphthoxypropylene oxide, butadiene monoxide, 3-vinyloxypropylene oxide, 3-trimethylsilyloxypropylene oxide, and the like. Among them, ethylene oxide and propylene oxide are preferred from the viewpoint of having high reactivities.

The metal catalyst includes, for example, zinc-based catalysts, aluminum-based catalysts, chromium-based catalysts, cobalt-based catalysts, and the like. Among them, zinc-based catalysts and cobalt-based catalysts are preferred because of having high polymerization activities in the polymerization reaction of an epoxide and carbon dioxide.

The zinc-based catalyst includes, for example, organozinc catalysts such as zinc acetate, diethylzinc, and dibutylzinc; organozinc catalysts obtainable by reacting a compound such as a primary amine, a dihydric phenol (benzenediol), an aromatic dicarboxylic acid, an aromatic hydroxy acid, an aliphatic dicarboxylic acid, or an aliphatic monocarboxylic acid and a zinc compound; and the like. Among these organozinc catalysts, organozinc catalysts obtainable by reacting a zinc compound, an aliphatic dicarboxylic acid and an aliphatic monocarboxylic acid are preferred, and organozinc catalysts obtainable by reacting zinc oxide, glutaric acid, and acetic acid are more preferred, because of having even higher polymerization activities.

As the above cobalt-based catalyst, for example, a cobalt complex represented by the formula (3):

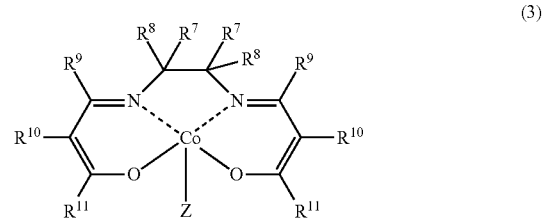

(3)

wherein each of $R^7$ and $R^8$, which may be identical or different, is independently a hydrogen atom, a substituted or unsubstituted alkyl group, a substituted or unsubstituted aromatic group, or a substituted or unsubstituted aromatic heterocyclic ring group, or two of $R^7$s or two of $R^8$s may be together bound to each other to form a substituted or unsubstituted, saturated or unsaturated aliphatic ring; each of $R^9$, $R^{10}$, and $R^{11}$ is independently a hydrogen atom, a substituted or unsubstituted alkyl group, a substituted or unsubstituted alkenyl group, a substituted or unsubstituted aromatic group, a substituted or unsubstituted aromatic heterocyclic ring group, a substituted or unsubstituted alkoxy group, a substituted or unsubstituted acyl group, a substituted or unsubstituted alkoxycarbonyl group, a substituted or unsubstituted aromatic hydroxycarbonyl group, a substituted or unsubstituted aralkyloxycarbonyl group, or $R^{10}$ and $R^{11}$ on adjoining carbon atoms may be bound to each other to form a substituted or unsubstituted aliphatic ring or a substituted or unsubstituted aromatic ring; Z is an anionic ligand selected from the group consisting of $F^-$, $Cl^-$, $Br^-$, $I^-$, $N_3^-$, $CF_3SO_3^-$, $p\text{-}CH_3C_6H_4SO_3^-$, $BF_4^-$, $NO_2^-$, $NO_3^-$, $OH^-$, $PF_6^-$, $BPh_4^-$, $SbF_6^-$, $ClO_4^-$, $OTf^-$, $OTs^-$, an aliphatic carboxylate, an aromatic carboxylate, an alkoxide, and an aromatic oxide can be used.

Among the cobalt complex represented by the formula (3), a cobalt complex represented by the formula (4):

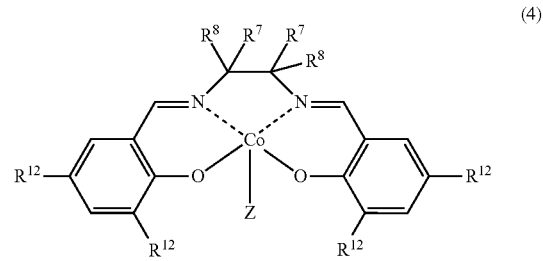

(4)

wherein each of $R^7$ and $R^8$, which may be identical or different, is independently a hydrogen atom, a substituted or unsubstituted alkyl group, a substituted or unsubstituted aromatic group, or a substituted or unsubstituted aromatic heterocyclic group, or two of $R^7$s or two of $R^8$s may be together bound to each other to form a substituted or unsubstituted, saturated or unsaturated aliphatic ring; each of plural $R^{12}$s is independently a hydrogen atom, an alkyl group having from 1 to 6 carbon atoms, an alkoxy group having from 1 to 6 carbon atoms, a substituted or unsubstituted aromatic group, or a halogen atom; Z is an anionic ligand selected from the group consisting of F⁻, Cl⁻, Br⁻, I⁻, $N_3^-$, $CF_3SO_3^-$, $p\text{-}CH_3C_6H_4SO_3^-$, $NO_3^-$, $OH^-$, $PF_6^-$, $BPh_4^-$, $SbF_6^-$, $ClO_4^-$, OTf⁻, OTs⁻, an aliphatic carboxylate, an aromatic carboxylate, an alkoxide, and an aromatic oxide is preferred.

Among the cobalt complexes represented by the formula (4), preferred specific examples include cobalt complexes represented by the following formulae (4-1) to (4-5).

(4-1)

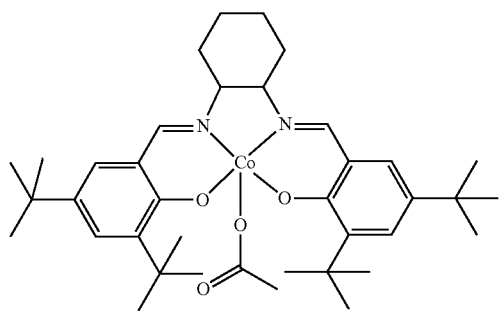

(4-2)

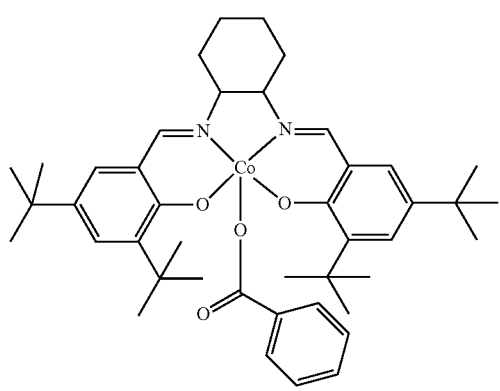

(4-3)

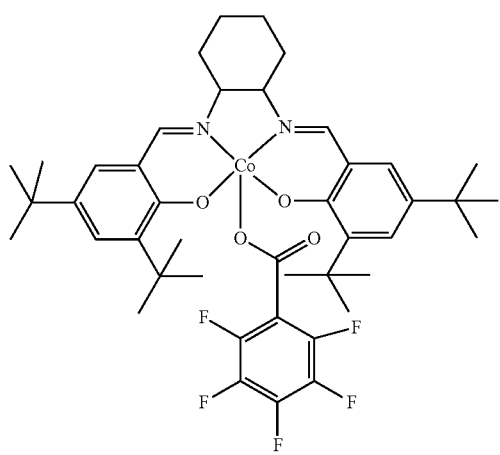

-continued (4-4)

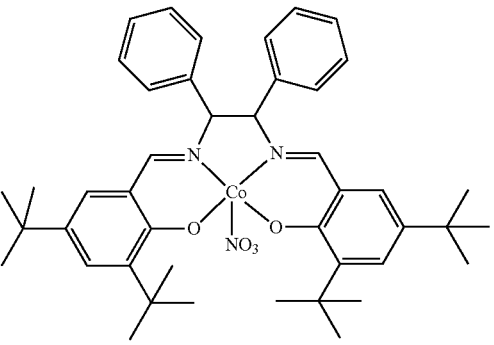

(4-5)

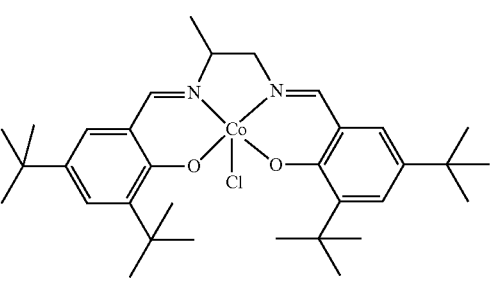

The amount of the metal catalyst used that is usable in the above polymerization reaction, based on 100 parts by mass of the epoxide, is preferably 0.001 parts by mass or more, and more preferably 0.01 parts by mass or more, from the viewpoint of accelerating the progress of the polymerization reaction, and the amount used is preferably 20 parts by mass or less, and more preferably 10 parts by mass or less, from the viewpoint of obtaining the effects that measure up the amount used.

The above polymerization reaction may be carried out optionally in the presence of a promoter, in addition to the metal catalyst. The promoter includes bis(triphenylphosphoranylidene) ammonium chloride (PPNCl), piperidine, bis(triphenylphosphoranylidene) ammonium fluoride (PPNF), bis(triphenylphosphoranylidene) ammonium pentafluorobenzoate (PPNOBzF₅), tetra-n-butylammonium chloride (nBu₄NCl), tetra-n-butylammonium bromide (nBu₄NBr), tetra-n-butylammonium iodide (nBu₄NI), tetra-n-butylammonium acetate (nBu₄NOAc), tetra-n-butylammonium nitrate (nBu₄NO₃), triethyl phosphine (Et₃P), tri-n-butyl phosphine (nBu₃P), triphenyl phosphine (Ph₃P), pyridine, 4-methylpyridine, 4-formylpyridine, 4-(N,N-dimethylamino)pyridine, N-methylimidazole, N-ethylimidazole, N-propylimidazole, and the like. Among them, PPNCl, PPNF, PPNOBzF₅, and nBu₄NCl are preferred, and PPNCl and PPNF are more preferred, from the viewpoint of having high reaction activities.

The amount of the promoter used is preferably from 0.1 to 10 mol, more preferably from 0.3 to 5 mol, and even more preferably from 0.5 to 1.5 mol, based on one mol of the metal catalyst.

In the above polymerization reaction, a reaction solvent may be optionally used. The reaction solvent is not particularly limited, and various organic solvents can be used. The organic solvent includes aliphatic hydrocarbon-based solvents such as pentane, hexane, octane, decane, and cyclohexane; aromatic hydrocarbon-based solvents such as benzene, toluene, and xylene; halogenated hydrocarbon-based solvents such as methylene chloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene, and bromobenzene; ether-based solvents such as dimethoxyethane, tetrahydrofuran, 2-methyltetrahydrofuran, 1,4-dioxane, and 1,3-dioxolane; ester-based solvents such as ethyl acetate, n-propyl acetate, and isopropyl acetate; amide-based solvents such as N,N-dimethylformamide and N,N-dimethylacetamide; carbonate-based solvents such as dimethyl carbonate, ethyl methyl carbonate, diethyl carbonate, and propylene carbonate; and the like.

The amount of the reaction solvent used is preferably from 100 to 10,000 parts by mass, from the viewpoint of smoothly progressing the reaction, based on 100 parts by mass of the epoxide.

The method for carrying out a polymerization reaction of an epoxide and carbon dioxide in the presence of a metal catalyst includes, but not particularly limited to, for example, a method including charging an autoclave with an epoxide, a metal catalyst and optionally a promoter, a reaction solvent or the like, mixing the contents, and thereafter pressurizing with carbon dioxide to react.

The amount of carbon dioxide used usable in the above polymerization reaction is preferably from 1 to 10 mol, more preferably from 1 to 5 mol, and even more preferably from 1 to 3 mol, based on one mol of the epoxide.

The used pressure of carbon dioxide usable in the above polymerization reaction is, but not particularly limited to, preferably 0.1 MPa or more, more preferably 0.2 MPa or more, and even more preferably 0.5 MPa or more, from the viewpoint of smoothly progressing the reaction, and the used pressure is preferably 20 MPa or less, more preferably 10 MPa or less, and even more preferably 5 MPa or less, from the viewpoint of obtaining effects that measure up to the used pressure.

The polymerization reaction temperature in the above polymerization reaction is, but not particularly limited to, preferably 0° C. or higher, more preferably 10° C. or higher, and even more preferably 20° C. or higher, from the viewpoint of shortening the reaction time, and the polymerization reaction temperature is preferably 100° C. or lower, more preferably 90° C. or lower, and even more preferably 80° C. or lower, from the viewpoint of controlling side reactions, thereby increasing in yields.

The polymerization reaction time cannot be unconditionally determined because the polymerization reaction time differs depending upon the polymerization reaction conditions, and it is preferable that the polymerization reaction time is usually from 1 to 40 hours or so.

The mass-average molecular weight of the aliphatic polycarbonate resin thus obtained is preferably 3,000 or more, and more preferably 10,000 or more, from the viewpoint of avoiding the lowering of dispersibility of fine inorganic particles, when used as a paste composition prepared by mixing the aliphatic polycarbonate resin with fine inorganic particles, and avoiding the lowering of the properties of sintered bodies due to localization of fine inorganic particles when molding, and the mass-average molecular weight is preferably 1,000,000 or less, more preferably 500,000 or less, and even more preferably 300,000 or less, from the viewpoint of avoiding the lowering of handling property due to the lowering of solubility of the aliphatic polycarbonate resin in a solvent.

As mentioned above, the aliphatic polycarbonate resin of the present invention has a feature that the aliphatic polycarbonate resin has a carboxy group bound to a methylene group or an ethylene group in a side chain, and that a thermal decomposition temperature is a low temperature. Therefore, the aliphatic polycarbonate resin of the present invention has a mass loss percentage after keeping at 160° C. for 1 hour in a thermogravimetric analysis measurement is preferably 90% or more, more preferably 95% or more, and even more preferably 99% or more, and the mass loss percentage after keeping at 100° C. for 1 hour is preferably 5% or less, more preferably 3% or less, and even more preferably 1% or less, from the viewpoint of inhibiting the decomposition during the process before the thermal decomposition step. The thermal decomposition temperature can be adjusted by a content of the constituting unit represented by the formula (1).

Therefore, the content of the constituting unit represented by the formula (1) in the aliphatic polycarbonate resin of the present invention in the entire constituting units constituting the aliphatic polycarbonate resin is preferably 30% by mol or less, more preferably 20% by mol or less, and even more preferably 10% by mol or less, from the viewpoint of reducing the residual carbon after thermal decomposition, and the content is preferably 0.001% by mol or more, more preferably 0.1% by mol or more, even more preferably 0.5% by mol or more, even more preferably 1.0% by mol or more, from the viewpoint of lowering a decomposition temperature. From the above viewpoint, the content of the constituting unit represented by the formula (1) is preferably from 0.001 to 30% by mol, more preferably from 0.1 to 20% by mol, even more preferably from 0.5 to 20% by mol, and even more preferably from 1.0 to 10% by mol, in the entire constituting units constituting the aliphatic polycarbonate resin.

The initial thermal decomposition temperature of the aliphatic polycarbonate resin of the present invention is preferably 80° C. or higher, more preferably 100° C. or higher, and even more preferably 120° C. or higher, from the viewpoint of inhibiting decomposition during the processes before the decomposition step, and the initial thermal decomposition temperature is preferably 160° C. or lower, more preferably 155° C. or lower, and even more preferably 150° C. or lower, from the viewpoint of shortening the heating time in the decomposition step.

The glass transition temperature of the aliphatic polycarbonate resin of the present invention is preferably 0° C. or higher, more preferably 10° C. or higher, and even more preferably 15° C. or higher, from the viewpoint of strength of a molded article when molded before sintering, and the glass transition temperature is preferably 50° C. or lower, more preferably 40° C. or lower, and even more preferably 30° C. or lower, from the viewpoint of flexibility of a molded article when molded before sintering.

Since the aliphatic polycarbonate resin of the present invention has a reduced residual carbon after sintering and can be subjected to a degreasing treatment at a temperature of 160° C. or lower, the aliphatic polycarbonate resin is useful as a binder resin used in the production of a molded article. By using the aliphatic polycarbonate resin of the present invention, not only great conservation of energy in the degreasing step is made possible, but also applications to substrates of which heat resistance is not very high are made possible.

The thermally decomposable binder of the present invention can be used by, for example, dissolving an aliphatic polycarbonate resin in a dissolvable solvent.

The solvent in which the aliphatic polycarbonate resin is dissolvable includes, but not particularly limited to, for example, toluene, ethyl acetate, butyl acetate, isopropyl alcohol, methyl isobutyl ketone, methyl ethyl ketone, N-methyl-2-pyrrolidone, ethylene glycol ethyl ether, ethylene glycol monobutyl ether, ethylene glycol monoethyl ether acetate, diethylene glycol monoethyl ether, diethylene glycol monomethyl ether, diethylene glycol monoisobutyl ether, trimethylpentanediol monoisobutyrate, ethyl carbitol, butyl carbitol, ethyl carbitol acetate, butyl carbitol acetate, terpineol, terpineol acetate, dihydroterpineol, dihydroterpineol acetate, texanol, isophorone, butyl lactate, dioctyl phthalate, dioctyl adipate, benzyl alcohol, phenylpropylene glycol, cresol, N,N-dimethylformamide, propylene carbonate, and the like. Among them, N-methyl-2-pyrrolidone, terpineol, terpineol acetate, ethyl carbitol acetate, butyl carbitol acetate, texanol, and propylene carbonate are preferred, from the viewpoint of having an appropriately high boiling point, thereby making it more easily uniformly evaporating during sintering. Here, these organic solvents may be used alone or in combination of two or more kinds.

The amount of the solvent mixed is preferably from 100 to 2,000 parts by mass, more preferably from 200 to 1,500 parts by mass, and even more preferably from 300 to 1,000 parts by mass, based on 100 parts by mass of the aliphatic polycarbonate resin, from the viewpoint of easiness in handling the binder obtained.

In addition, the aliphatic polycarbonate resin of the present invention can be subjected to a degreasing treatment even under a non-oxidizing atmosphere, so that the aliphatic polycarbonate resin can be mixed and used with fine inorganic particles for which degreasing is desired in a non-oxidizing atmosphere because of being reactive with oxygen.

Therefore, the present invention further provides a fine inorganic particle-dispersed paste composition containing an aliphatic polycarbonate resin of the present invention as a binder resin.

Here, in the thermally decomposable binder and the fine inorganic particle-dispersed paste composition, an aliphatic polycarbonate resin not containing a constituting unit represented by the formula (1) of the present invention may be contained, and not just the aliphatic polycarbonate resin containing the constituting unit represented by the formula (1).

Therefore, it is preferable that the content of the constituting unit represented by the formula (1) in the entire monomer units constituting the aliphatic polycarbonate resin contained in the thermally decomposable binder and the fine inorganic particle-dispersed paste composition is within the range described as the content of the constituting unit represented by the formula (1) in the aliphatic polycarbonate resin of the present invention.

Specifically, in a case where a thermally decomposable binder is composed only of an aliphatic polycarbonate resin of the present invention, it is preferable that the content of the constituting unit represented by the formula (1) in the aliphatic polycarbonate resin of the present invention is within the above range.

Alternatively, in a case where a thermally decomposable binder is a mixture of an aliphatic polycarbonate resin of the present invention and an aliphatic polycarbonate resin not containing a constituting unit represented by the formula (1), it is preferable that the content of the constituting unit represented by the formula (1) in the entire monomer units of combined plural aliphatic polycarbonate resins contained in the thermally decomposable binder is within the above range.

The same applies to a case where a fine inorganic particle-dispersed paste composition contains only an aliphatic polycarbonate resin of the present invention as a binder resin, and to a case where a fine inorganic particle-dispersed paste composition contains an aliphatic polycarbonate resin of the present invention and an aliphatic polycarbonate resin not containing a constituting unit represented by the formula (1).

The fine inorganic particle-dispersed paste composition of the present invention contains an aliphatic polycarbonate resin of the present invention, fine inorganic particles, and a solvent.

The fine inorganic particles are, but not particularly limited to, preferably at least one member selected from the group consisting of electroconductive particles, ceramic powders, glass powders, and fine inorganic phosphor particles.

The electroconductive particles include, for example, metal particles made of copper, iron, nickel, palladium, platinum, gold, silver, aluminum, tungsten, alloys thereof, and the like.

The glass powders include, for example, glass powders made of various silicon oxides such as $CaO$—$Al_2O_3$—$SiO_2$ system, $MgO$—$Al_2O_3$—$SiO_2$ system, and $LiO_2$—$Al_2O_3$—$SiO_2$ system, bismuth oxide glass, silicate glass, lead glass, zinc glass, boron glass, and the like.

In addition, as glass powders, a glass powder made of a $PbO$—$B_2O_3$—$SiO_2$ mixture, a $BaO$—$ZnO$—$B_2O_3$—$SiO_2$ mixture, a $ZnO$—$Bi_2O_3$—$B_2O_3$—$SiO_2$ mixture, a $Bi_2O_3$—$B_2O_3$—$BaO$—$CuO$ mixture, a $Bi_2O_3$—$ZnO$—$B_2O_3$—$Al_2O_3$—$SrO$ mixture, a $ZnO$—$Bi_7O_3$—$B_2O_3$ mixture, a $Bi_2O_3$—$SiO_2$ mixture, a $P_2O_5$—$Na_2O$—$CaO$—$BaO$—$Al_2O_3$—$B_2O_3$ mixture, $P_2O_5$—$SnO$ mixture, a $P_2O_5$—$SnO$—$B_2O_3$ mixture, a $P_2O_5$—$SnO$—$SiO_2$ mixture, a $CuO$—$P_2O_5$—$RO$ mixture, an $SiO_2$—$B_2O_3$—$ZnO$—$Na_2O$—$Li_2O$—$NaF$—$V_2O_5$ mixture, a $P_2O_5$—$ZnO$—$SnO$—$R_2O$—$RO$ mixture, a $B_2O_3$—$SiO_2$—$ZnO$ mixture, a $B_2O_3$—$SiO_2$—$Al_2O$—$ZrO_2$ mixture, an $SiO_2$—$B_2O_3$—$ZnO$—$R_2O$—$RO$ mixture, an $SiO_2$—$B_2O_3$—$Al_2O_3$—$RO$—$R_2O$ mixture, an $SrO$—$ZnO$—$P_2O_5$ mixture, an $SrO$—$ZnO$—$P_2O_5$ mixture, a $BaO$—$ZnO$—$B_2O_3$—$SiO_2$ mixture, or the like can be used. Here, the above R stands for an element selected from the group consisting of Zn, Ba, Ca, Mg, Sr, Sn, Ni, Fe, and Mn.

The ceramic powders include, for example, powders of alumina, zirconia, titanium oxide, barium titanate, alumina nitride, silicon nitride, boron nitride, silicon carbide, and the like. In addition, nano-ITO (tin-doped indium oxide) usable in transparent electrode materials, or nano-titanium oxide usable in dye sensitized solar cells, or the like can be suitably used.

The fine inorganic phosphor particles include, for example, $BaMgAl_{10}O_{17}$:Eu, $Zn_2SiO_4$:Mn, (Y, Gd)$BO_3$:Eu, and the like.

The content of the aliphatic polycarbonate resin in the fine inorganic particle-dispersed paste composition, based on 100 parts by mass of the above fine inorganic particles, is preferably 0.001 parts by mass or more, more preferably 0.01 parts by mass or more, and even more preferably 0.1 parts by mass or more, from the viewpoint of avoiding the lowering of dispersibility of fine inorganic particles, thereby avoiding the lowering of the properties of the sintered bodies due to localization of the fine inorganic particles during molding, and the content is preferably 20 parts by mass or less, more preferably 15 parts by mass or less, and even more preferably 10 parts by mass or less, from the viewpoint of reducing a decomposed product formed by excessive decomposition of the aliphatic polycarbonate resin when sintering a fine inorganic particle-dispersed paste composition, thereby obtaining a close-packed sintered body. Here, the content of the aliphatic polycarbonate resin as referred to herein is not only the aliphatic polycarbonate having a constituting unit represented by the formula (1) but a total amount when two or more aliphatic polycarbonate resins are used in combination.

As the solvent, the same solvents as those usable in the above thermally decomposable binder are preferred.

The content of the solvent in the fine inorganic particle-dispersed paste composition, based on 100 parts by mass of the fine inorganic particles, is preferably 0.001 parts by mass or more, more preferably 0.01 parts by mass or more, and even more preferably 0.1 parts by mass or more, from the viewpoint of dispersibility of the fine inorganic particles, and the content is preferably 100 parts by mass or less, more preferably 80 parts by mass or less, and even more preferably 50 parts by mass or less, from the viewpoint of adjusting viscosity of the fine inorganic particle-dispersed paste composition.

The fine inorganic particle-dispersed paste composition of the present invention may optionally contain an additive.

The additive includes adhesion accelerators, surfactants, plasticizers, storage stabilizers, defoaming agents, and the like.

The adhesion accelerators include amine-based silane coupling agents, glycidyl-based silane coupling agents, and the like. The surfactants include polyoxyethylene-based surfactants, fatty acid ester-based surfactants, and the like. The plasticizers include polyether-polyols, phthalate esters, and the like. The storage stabilizers include amine compounds, carboxylic acid compounds, phosphorus-containing compounds, sulfur-containing compounds, triazole-based compounds, and the like. The defoaming agents include hydrophobic silicas, polyalkylene derivatives, polyether derivatives, and the like.

The content of the additive in the fine inorganic particle-dispersed paste composition is preferably 50 parts by mass or less, and more preferably 30 parts by mass or less, based on 100 parts by mass of the fine inorganic particles.

The method for preparing a fine inorganic particle-dispersed paste composition includes, but not particularly limited to, a method including mixing an aliphatic polycarbonate resin, a solvent, fine inorganic particles, and optionally an additive, while stirring by using a conventionally known stirring method, and the like.

The above known stirring method includes, for example, a method of kneading with an apparatus such as a ball-mill, a Brabender mill, or a triple roller mill, a method of kneading with a mortar, and the like.

The thermally decomposable binder or the fine inorganic particle-dispersed paste composition of the present invention is kneaded with the raw materials, a kneaded mixture is molded, a molded product is then sintered and degreased, whereby a molded article can be obtained. In the sintering step, the aliphatic polycarbonate resin of the present invention undergoes thermal decomposition by heating at a low temperature to be removed.

EXAMPLES

The present invention will be described more specifically by Examples, without intending to limit the present invention to these Examples. The physical properties of the aliphatic polycarbonate resin and the like were measured by methods described below.

[Content of Constituting Unit Represented by Formula (1) in Aliphatic Polycarbonate Resin]

The compositional ratio of the constituting unit in the resin is analyzed by $^1$H-NMR, and the content proportion of carboxy group in the aliphatic polycarbonate resin is defined as the content of the constituting unit represented by the formula (1).

The aliphatic polycarbonate resin is subjected to a $^1$H-NMR measurement in deuterated chloroform at 25° C., and an integral value (A) of a peak ascribed to a methyne group adjoining a carbonate group appearing near 5.0 ppm and an integral value (B) of a peak ascribed to a methylene group adjoining a carboxy group appearing near 2.8 ppm are obtained, and the content proportion of carboxy group is calculated by the following calculation formula.

Content Proportion of Carboxy Group (% by mol)=$B/(2 \times A) \times 100$

In addition, when a content proportion of carboxy group is small, it may be difficult to calculate by the above method in some cases. In those cases, assuming that the amount of carboxy group does not change in the step of obtaining an aliphatic polycarbonate resin containing a carboxy group from an aliphatic polycarbonate resin precursor containing a carboxy group of which carboxy group is protected, the precursor is subjected to $^1$H-NMR measurement in deuterated chloroform at 25° C., and an integral value (C) of peaks ascribed to groups containing a protective group and an integral value (D) of peaks ascribed to groups contained in constituting units not containing a protective group are obtained, and a content proportion of carboxy group is calculated by the following calculation formula. For example, in the case of Example 1, an integral value (C) of the peaks ascribed to a phenyl group appearing near 7.3 to 7.4 ppm and an integral value (D) of peaks ascribed to a methyl group appearing near 1.3 to 1.4 ppm are used.

Content Proportion of Carboxy Group (% by mol)=$5 \times D/(3 \times C + 5 \times D) \times 100$

[Mass-Average Molecular Weight (Mw) of Aliphatic Polycarbonate Resin]

A chloroform solution having an aliphatic polycarbonate resin concentration of 0.5% by mass is prepared, and subjected to a measurement using high-performance liquid chromatography. After the measurement, comparisons are made with a polystyrene of which mass-average molecular weight is already known measured under the identical conditions, thereby calculating a mass-average molecular weight. In addition, the measurement conditions are as follows.

Column: GPC Column (Shodex K-804L, trade name of SHOWA DENKO CORPORATION)
Column Temperature: 40° C.
Eluate: Chloroform
Flow Rate: 1.0 mL/min

[Initial Thermal Decomposition Temperature of Aliphatic Polycarbonate Resin]

Thermal decomposition behaviors are measured by heating from room temperature to 400° C. at a heating rate of 20° C./min in a nitrogen atmosphere using TG/DTA6200 manufactured by Hitachi High-Tech Science. The initial thermal decomposition temperature is defined as an intersection of a line drawn parallel to an abscissa passing through the mass before initiation of test heating, and a tangent line drawn so that an incline between the inflection points in the decomposition curve is at its maximum.

[Mass Loss Percentage of Aliphatic Polycarbonate Resin after Keeping at Given Temperature for 1 Hour]

Thermal decomposition behaviors are measured by heating from room temperature to a given temperature (160° C. or 100° C.) at a heating rate of 50° C./min, and thereafter keeping at that temperature for 1 hour, in a nitrogen atmosphere using TG/DTA7220 manufactured by Hitachi High-Tech Science. The mass loss percentage is obtained by reading off a mass (W1) after one-hour heating from the decomposition curve, and calculating a ratio with an initial weight (W0) [(W0−W1)/W0×100].

[Glass Transition Temperature (Tg) of Aliphatic Polycarbonate]

The glass temperature is measured by heating and cooling from −30° to 60° C. at a heating rate and a cooling rate of 10° C./min in a nitrogen atmosphere using DSC7020 manufactured by Hitachi High-Tech Science. The glass transition temperature is defined as an intersection of a line extending a baseline from a low-temperature side to a high-temperature side and a tangent drawn so that an inclination of the curve of the stepwise inflected parts of the glass transition is at its maximum.

Production Example 1 [Production of Cobalt Complex]

A 0.2 L three-neck flask equipped with a stirrer and a gas inlet tube was charged with 5.0 g (8.3 mmol) of (S,S)—N,N'-bis(3,5-di-tert-butylsalicylidene)-1,2-cyclohexanediaminocobalt (purchased from Aldrich), 1.80 g (8.5 mmol) of pentafluorobenzoic acid, and 100 mL of dichloromethane, and the contents were stirred for 12 hours while introducing the air thereinto to react the components. The volatile component was distilled off under a reduced pressure, and thereafter a solid obtained was washed with 100 mL of a cold hexane, to give a cobalt complex represented by the above formula (4-3) mentioned above as a brown solid (yield amount: 6.6 g, yield rate: 98.5%).

Production Example 2 [Production of 2-Oxiranylbenzyl Acetate]

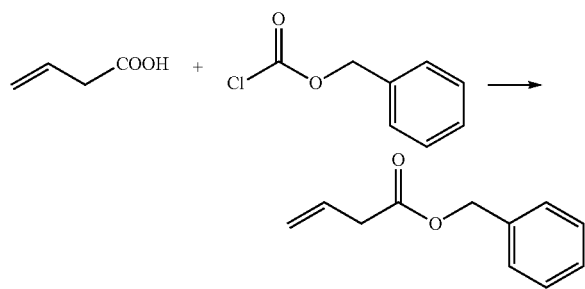

A 1 L four-neck flask equipped with a stirrer, a nitrogen gas inlet tube, a thermometer, and a dropping funnel was charged with 51.3 g (0.59 mol) of 3-butenoic acid, 117.9 g (1.49 mol) of pyridine, and 752 g of dichloromethane. Next, the reaction container was cooled to 10° C. or lower in an ice water bath, 106.7 g (0.62 mol) of benzyl chloroformate was added from a dropping funnel at a rate of 2.5 mL/min in a nitrogen atmosphere, and the contents were stirred for 8 hours so that an internal temperature would not exceed 20° C. to react. Thereafter, the precipitated solid was removed by filtration, a filtrate was washed with a saturated aqueous ammonium chloride, and excess pyridine was removed. The organic layer was dried over sodium sulfate, a dried mixture was concentrated, and dichloromethane was distilled off. The residual yellow liquid was purified by silica gel column chromatography (hexane/ethyl acetate=40/1 (v/v), Rf value: 0.33), to give benzyl 3-butenoate as a pale yellow liquid (yield amount: 74.4 g, yield rate: 72.3%).

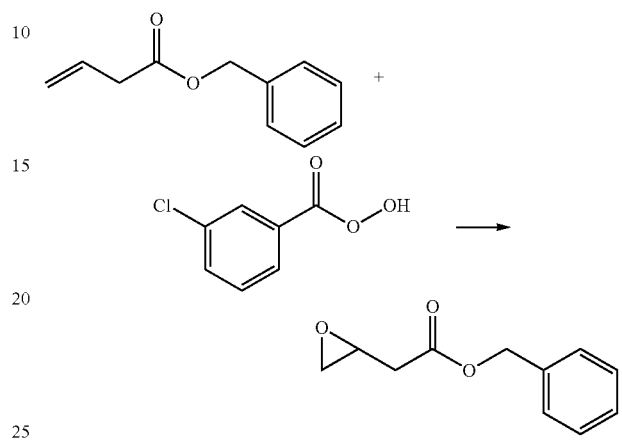

A 1 L four-neck flask equipped with a stirrer, a nitrogen gas inlet tube, and a thermometer was charged with 37.6 g (0.21 mol) of benzyl 3-butenoate and 528 g of dichloromethane, the reaction container was cooled to 5° C. or lower in an ice water bath, and 100 g (0.40 mol) of a 70% m-chloroperbenzoic acid was added thereto in 10 divided portions in a nitrogen atmosphere. The contents were stirred for 18 hours so that an internal temperature would not exceed 20° C. to react. Thereafter, the contents were cooled until an internal temperature is 5° C. or lower, a solid formed was removed by filtration, and a saturated aqueous sodium thiosulfate solution and a saturated aqueous sodium carbonate solution were added to a filtrate obtained to consume unreacted m-chloroperbenzoic acid. The organic layer was dried over sodium sulfate, a dried mixture was concentrated, and dichloromethane was distilled off. The residual yellow liquid was purified by silica gel column chromatography (hexane/ethyl acetate=10/1 (v/v), Rf value: 0.31), to give 2-oxiranylbenzyl acetate as a pale yellow liquid (yield amount: 37.8 g, yield rate: 92.0%).

Example 1

[Production of Aliphatic Polycarbonate Resin Precursor Containing Carboxy Group]

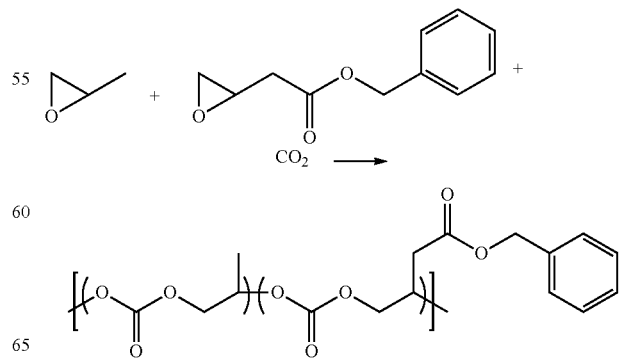

A 50 mL autoclave was charged with 11 mg (0.015 mmol) of a cobalt complex obtained in Production Example 1 and 8.0 mg (0.014 mmol) of bis(triphenylphosphoranylidene) ammonium chloride. After an internal of the system was replaced with an argon atmosphere, the system was charged with 1.62 g (28 mmol) of propylene oxide and 0.153 g (0.78 mmol) of 2-oxiranylbenzyl acetate obtained in Production Example 2. Next, carbon dioxide was added thereto while stirring, and carbon dioxide was filled until an internal of the reaction system reached 1.5 MPa (amount of carbon dioxide charged: 30 mmol). Thereafter, the polymerization reaction was carried out at 22° C. for 22 hours. The amount of consumption of carbon dioxide was 20.2 mmol. After the termination of the reaction, the autoclave was depressurized, and the contents were poured in methanol to precipitate a white solid. The white solid obtained was dried under a reduced pressure, to give 1.92 g of an aliphatic polycarbonate resin. The mass-average molecular weight of the aliphatic polycarbonate resin obtained was 15,700, and the amount of benzyl ester group introduced was 1.6 mol %.

The structure of the aliphatic polycarbonate resin obtained was identified by $^1$H-NMR.

$^1$H-NMR (CDCl$_3$) δ=7.4-7.3 (5H, —C$_6$H$_5$), 5.3 (1H, —C—CH—C—CO—), 5.2-5.1 (2H, —O—CH$_2$-Ph), 5.1-4.9 (1H, —(CO)O—CH—), 4.4-4.1 (2H, —CH$_2$—O(CO)—), 2.8-2.7 (2H, —C—CH$_2$—CO—) 1.4-1.3 (3H, —CH$_3$) ppm.

[Production of Aliphatic Polycarbonate Resin Containing Carboxy Group]

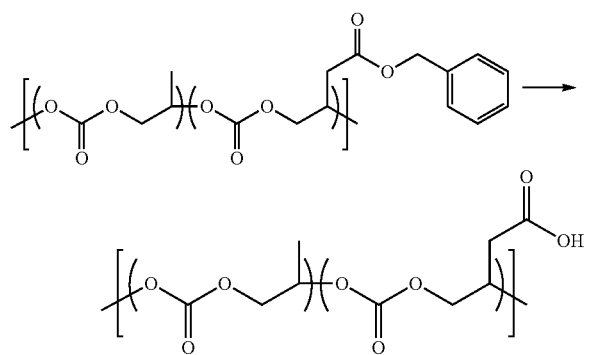

A 20 mL Schlenk flask equipped with a stirrer, a gas inlet tube, and a thermometer was charged with 1.0 g of an aliphatic polycarbonate resin obtained, 0.5 g of 10% palladium on carbon, 13.5 g of ethyl acetate, and 12.0 g of methanol, and degassed while freezing. Thereafter, the internal of the reaction container was replaced with hydrogen, and the contents were stirred at 40° C. and 1 atmospheric pressure of hydrogen for 24 hours. The solid was removed by filtration, the filtrate obtained was concentrated, and the concentrated filtrate was poured into methanol to precipitate the polymer. The polymer obtained was dried, to give 0.927 g of an aliphatic polycarbonate resin containing a carboxy group.

The structure of the aliphatic polycarbonate resin obtained was identified by $^1$H-NMR and $^{13}$C-NMR.

$^1$H-NMR (CDCl$_3$) δ=5.3 (1H, —C—CH—C—), 5.1-5.0 (1H, —(CO)O—CH—), 4.5-4.1 (2H, —CH$_2$—O(CO)—), 2.8-2.7 (2H, —C—CH$_2$—CO—), 1.4-1.3 (3H, —CH$_3$) ppm.

$^{13}$C-NMR (CDCl$_3$) δ=173.9 (—COOH), 154.6-154.2 (—O(CO)O—), 72.4-71.8 (—O—CH—CH$_2$—O—), 69.2-68.9 (—O—CH—CH$_2$—O—), 35.1 (—CH$_2$—COOH), 16.0 (—CH$_3$)

Examples 2 to 4

The reactions were carried out in the same manner as in Example 1 except that the amounts of propylene oxide and 2-oxiranylbenzyl acetate used were changed to those listed in Table 1, to give each of an aliphatic polycarbonate resin containing a carboxy group.

Comparative Example 1

The reactions were carried out in the same manner as in Example 1 except that 2-oxiranylbenzyl acetate was not used, to give 2.06 g of an aliphatic polycarbonate resin not containing a carboxy group.

Comparative Example 2

[Production of Aliphatic Polycarbonate Resin Precursor Containing Carboxy Group]

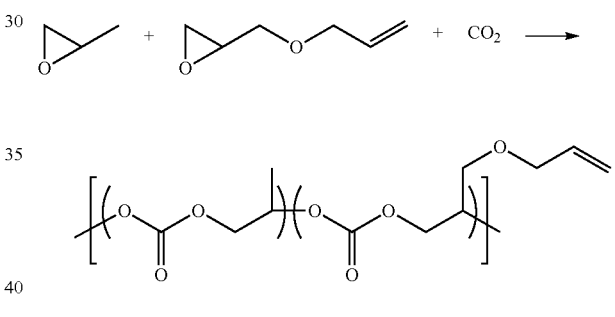

A 50 mL autoclave was charged with 13.8 mg (0.018 mmol) of a cobalt complex obtained in Production Example 1 and 10 mg (0.018 mmol) of bis(triphenylphosphoranylidene) ammonium chloride, an internal of the system was previously replaced with a carbon dioxide atmosphere, and the system was then charged with 8.0 g (140 mmol) of propylene oxide and 0.49 g (4.3 mmol) of allyl glycidyl ether. Next, carbon dioxide was added thereto while stirring, and carbon dioxide was filled until an internal of the reaction system reached 1.0 MPa. Subsequently, the polymerization reaction was carried out at 25° C. for 20 hours while supplementing carbon dioxide consumed by the reaction. After the termination of the reaction, the autoclave was depressurized, and the contents were poured into methanol, to precipitate a white solid. The white solid obtained was dried under a reduced pressure, to give 9.75 g of an aliphatic polycarbonate resin. The mass-average molecular weight of the aliphatic polycarbonate resin obtained was 61,000, and the amount of the allyl groups introduced was 1.9 mol %.

The structure of the aliphatic polycarbonate resin obtained was identified by $^1$H-NMR.

$^1$H-NMR (CDCl$_3$) δ=5.8-6.0 (1H, —CH=C), 5.3-5.1 (2H, —C=CH$_2$), 5.1-5.0 (1H, (CO)O—CH—), 4.5-4.2 (2H, —CH$_2$—O(CO)), 4.0 (2H, —CH$_2$O—), 3.63 (2H, —OCH$_2$—C=C), 1.3 (3H, —CH$_3$) ppm.

[Production of Aliphatic Polycarbonate Resin Containing Carboxy Group]

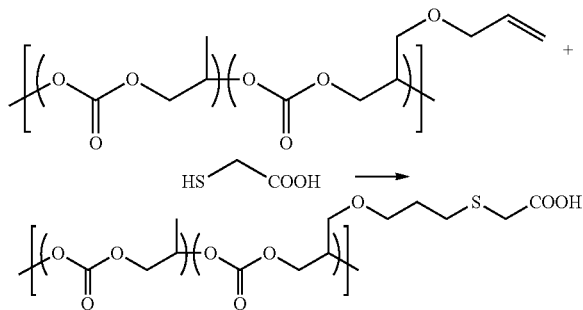

A 100 mL, four-neck flask equipped with a stirrer, a gas inlet tube, and a thermometer was charged with 5 g of an aliphatic polycarbonate resin obtained (corresponding to 1.0 mmol of the amount of allyl groups), 10 g of dimethyl carbonate, and 10 g of toluene, the internal of the reaction container was replaced with nitrogen, 23.6 mg (0.5 mmol) of 2,2'-azobis(2,4-dimethylvaleronitrile) and 0.44 g (5.0 mmol) of thioglycolic acid were added thereto, and the contents were stirred at 60° C. for 15 hours. Subsequently, the reaction solution was concentrated, and the residual concentrated solution was poured to methanol to precipitate a polymer. The polymer obtained was dried to give 4.7 g of an aliphatic polycarbonate resin containing a carboxy group.

The structure of the aliphatic polycarbonate resin obtained was identified by $^1$H-NMR.

$^1$H-NMR (CDCl$_3$) δ=5.1-5.0 (1H, (CO)O—CH—), 4.5-4.2 (2H, —CH$_2$—O(CO)), 3.6-3.4 (4H, —CH$_2$O—), 3.24 (2H, —S—CH$_2$—(CO)O), 2.71 (2H, —O—C—CH$_2$—S—), 1.86 (2H, O—CH$_2$—C—S—), 1.3 (3H, —CH$_3$) ppm.

A TG-DTA (thermogravimetric differential thermal analysis) curve of aliphatic polycarbonate resins obtained in Example 1, Comparative Example 1, and Comparative Example 2 is shown in FIG. 1.

The mass-average molecular weight, the content proportion of carboxy group, the initial thermal decomposition temperature, the mass loss percentage after keeping at 160° C. for 1 hour, and the mass loss percentage after keeping 100° C. for 1 hour, and the glass transition temperature of the aliphatic polycarbonate resin obtained in each of Examples and Comparative Examples are shown in Table 1.

Example 5

A 5 mL eggplant-shaped flask was charged with 0.12 g of an aliphatic polycarbonate resin containing a carboxy group obtained in Example 1 and 0.88 g of N-methyl-2-pyrrolidone, to dissolve, to give 1.0 g of a uniform binder solution.

The amount 4.0 g of silver particles (manufactured by DAIKEN CHEMICAL CO., LTD., under the trade name of S-211, median particle size: 0.311 μm) was weighed and placed in a mortar, and an entire amount of the above binder solution was gradually added while kneading the mixture. The mixture was kneaded until it is a uniform paste, to give 5.0 g of a silver particle-dispersed paste composition.

Example 6

The same procedures as in Example 5 were carried out except that the aliphatic polycarbonate resin was changed to a mixed resin composed of 0.03 g of an aliphatic polycarbonate resin containing a carboxy group obtained in Example 1 and 0.09 g of an aliphatic polycarbonate resin not containing a carboxy group obtained in Comparative Example 1, to give 5.0 g of a silver particle-dispersed paste composition. The weight loss percentage after keeping the resin mixture at 160° C. for 1 hour was 95.5%, and the weight loss percentage after keeping the resin mixture at 100° C. for 1 hour was 1.0%.

Comparative Example 3

The same procedures as in Example 5 were carried out except that the aliphatic polycarbonate resin was changed to 0.12 g of an aliphatic polycarbonate resin not containing a carboxy group obtained in Comparative Example 1, to give 5.0 g of a silver particle-dispersed paste composition.

Comparative Example 4

The same procedures as in Example 5 were carried out except that the aliphatic polycarbonate resin was changed to 0.12 g of an aliphatic polycarbonate resin containing a carboxy group obtained in Comparative Example 2, to give 5.0 g of a silver particle-dispersed paste composition.

TABLE 1

| | Aliphatic Polycarbonate Resin | | | | | | | |
|---|---|---|---|---|---|---|---|---|
| | Propylene Oxide | 2-Oxiranyl-benzyl Acetate | Mw | Content Ratio of Constituting Unit of formula (1) | Initial Thermal Decomposition Temperature | Mass Loss Percentage (per 1 h) | | Tg |
| | | | | | | 160° C. | 100° C. | |
| Ex. 1 | 1.62 g (28 mmol) | 0.153 g (0.78 mmol) | 15,900 | 1.6% by mol | 150° C. | 95.4% | 0.9% | 19° C. |
| Ex. 2 | 1.62 g (28 mmol) | 0.274 g (1.4 mmol) | 11,200 | 3.4% by mol | 150° C. | 95.5% | 1.0% | 19° C. |
| Ex. 3 | 1.62 g (28 mmol) | 0.548 g (2.8 mmol) | 7,300 | 7.7% by mol | 158° C. | 95.5% | 0.9% | 12° C. |
| Ex. 4 | 1.62 g (28 mmol) | 1.10 g (5.6 mmol) | 5,000 | 16.7% by mol | 157° C. | 96.2% | 1.1% | 11° C. |
| Comp. Ex. 1 | 1.62 g (28 mmol) | — | 177,000 | — | 220° C. | 5.4% | 0.1% | 35° C. |
| Comp. Ex. 2 | 8.0 g (140 mmol) | — | 54,000 | 1.9% by mol | 253° C. | 0.3% | 0% | 27° C. |

A sintered body was produced using each of the silver particle-dispersed paste compositions obtained in Examples 5 and 6 and Comparative Examples 3 and 4, and the volume resistivity of the sintered body obtained was measured. The results are shown in Table 2. High volume resistivity means a component resistive is present, in other words, a binder resin is not completely decomposed or even if a binder resin is decomposed, much residual carbon contents are present. On the other hand, low volume resistivity means that a component resistive is not present, in other words, a binder resin is completely decomposed, and there are hardly any residual carbon contents.

[Production of Sintered Bodies]

As an insulation substrate, a slide glass (width: 26 mm, length: 76 mm, thickness: 1 mm) was prepared, and its surface was cleaned with acetone. Thereafter, the slide glass was subjected to a surface treatment using a UV/ozone processing unit (manufactured by SEN LIGHTS CORPORATION, under the trade name a bench-type photo-surface processing unit PL16-110), to provide a slide glass for tests.

A rectangular (10 mm×40 mm) pattern was formed on the slide glass for tests with a masking tape, and a silver particle-dispersed paste composition was poured over the patterned slide glass. After coating, the masking tape was removed, and the coating was dried at 25° C. for 6 hours. According to the same method, three pieces of coated slide glass each was prepared for one condition.

Each of the coated slide glass obtained was heated from 25° C. to a temperature of 150° C. or 160° C. in 10 minutes using a bench-type electric muffle furnace (manufactured by EYELA under the trade name of KDF S90), kept at the above temperature for 30 minutes, and then air-cooled to 25° C., to give a sintered body, 3 of each.

[Thickness of Sintered Bodies]

The thickness of the sintered body obtained was measured with a film thickness measurement instrument (manufactured by Kosaka Laboratory Ltd., under the trade name of Microfigure Measuring Instrument surfcorder ET3000i), and an average of 3 sintered bodies was obtained. The results are shown in Table 2.

[Volume Resistivity of Sintered Bodies]

The volume resistivity of each of the sintered bodies was measured with a resistivity meter (manufactured by Mitsubishi Chemical, under the trade name of Loresta EP MCP-T360), and an average of three sintered bodies was obtained. Here, the volume resistivity was automatically calculated by inputting the thickness of the above sintered bodies to the resistivity meter. The results are shown in Table 2.

TABLE 2

| | Sintering Temperature: 150° C. | | Sintering Temperature: 160° C. | |
|---|---|---|---|---|
| | Thickness (mm) | Volume Resistivity ($\Omega \cdot cm$) | Thickness (mm) | Volume Resistivity ($\Omega \cdot cm$) |
| Ex. 5 | 0.101 | $2.98 \times 10^{-5}$ | 0.090 | $2.78 \times 10^{-5}$ |
| Ex. 6 | 0.127 | $7.73 \times 10^{-5}$ | 0.133 | $8.53 \times 10^{-5}$ |
| Comp. Ex. 3 | 0.178 | $1.65 \times 10^{-3}$ | 0.191 | $1.75 \times 10^{-4}$ |
| Comp. Ex. 4 | 0.157 | $9.57 \times 10^{-2}$ | 0.177 | $1.08 \times 10^{-3}$ |

It can be seen from the comparisons of Example 5 and Comparative Example 3 that a sintered body using an aliphatic polycarbonate resin of Example 5 as a binder has a lower volume resistivity and degreasing is nicely perfected in both of the sintering temperatures. In addition, it can be seen from Example 6 that even when an aliphatic polycarbonate resin having a constituting unit represented by the formula (1) and an aliphatic polycarbonate resin not having the constituting unit are mixed and used, the same effects as in the present invention can be found. On the other hand, it can be seen from the comparison of Example 5 and Comparative Example 4 that an aliphatic polycarbonate resin obtained in Comparative Example 2 though has a carboxy group but away in distance from a main chain, so that its volume resistivity is high and the thermal decomposition temperature is not lowered.

INDUSTRIAL APPLICABILITY

The thermally decomposable binder and the fine inorganic particle-dispersed paste composition, each containing an aliphatic polycarbonate resin of the present invention can be used in general molded articles, optical materials such as films, fibers, optical fibers, and optical disks, thermally decomposable materials such as ceramic binders, and lost foam casting, medicinal materials such as drug capsules, additives for biodegradable resins, main components for biodegradable resins, and the like.

The invention claimed is:

1. A thermally decomposable binder comprising an aliphatic polycarbonate resin comprising a constituting unit represented by the formula (1):

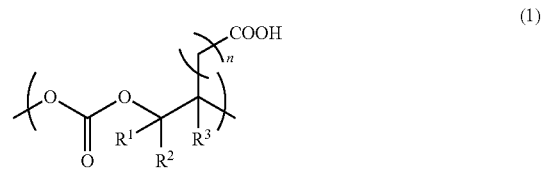

(1)

wherein each of $R^1$, $R^2$ and $R^3$, which may be identical or different, is a hydrogen atom, an alkyl group having from 1 to 10 carbon atoms, or an aryl group having from 6 to 20 carbon atoms; and n is 1 or 2;

wherein one end of a polymer chain of the aliphatic polycarbonate resin is an anionic ligand selected from the group consisting of $F^-$, $Cl^-$, $Br^-$, $I^-$, $N_3^-$, $CF_3SO_3^-$, p-$CH_3C_6H_4SO_3^-$, $BF_4^-$, $NO_2^-$, $NO_3^-$, $OH^-$, $PF_6^-$, $BPh_4^-$, $SbF_6^-$, $ClO_4^-$, $OTf^-$, $OTs^-$, an aliphatic carboxylate, an aromatic carboxylate, an alkoxide, and an aromatic oxide and the other end of the polymer chain of the aliphatic polycarbonate resin is OH.

2. The thermally decomposable binder according to claim 1, wherein the content of the constituting unit represented by the formula (1) is from 0.001 to 30% by mol in the entire constituting units constituting the aliphatic polycarbonate resin.

3. The thermally decomposable binder according to claim 1 or 2, wherein the aliphatic polycarbonate resin further comprises a constituting unit represented by the formula (2):

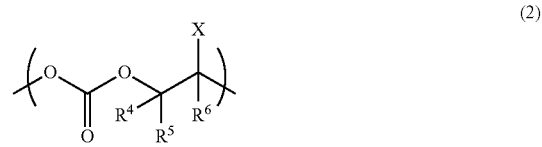

(2)

wherein each of $R^4$, $R^5$, and $R^6$, which may be identical or different, is a hydrogen atom, an alkyl group having from 1 to 10 carbon atoms, or an aryl group having from 6 to 20 carbon atoms; X is a hydrogen atom, an alkyl group having from 1 to 10 carbon atoms, a haloalkyl group having from 1 to 10 carbon atoms, an ether bond-containing group, an ester bond-containing group, or an allyl group.

4. The thermally decomposable binder according to claim 1, wherein a mass loss percentage after keeping at 160° C. for 1 hour in a thermogravimetric analysis is 90% or more.

5. An inorganic particle-dispersed paste composition comprising an aliphatic polycarbonate resin comprising a constituting unit represented by the formula (1):

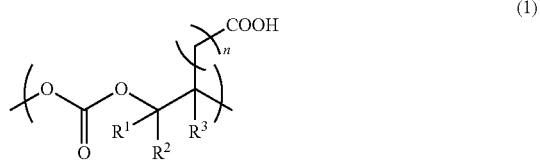

(1)

wherein each of $R^1$, $R^2$ and $R^3$, which may be identical or different, is a hydrogen atom, an alkyl group having from 1 to 10 carbon atoms, or an aryl group having from 6 to 20 carbon atoms; and n is 1 or 2, inorganic particles, and a solvent;

wherein one end of a polymer chain of the aliphatic polycarbonate resin is an anionic ligand selected from the group consisting of $F^-$, $Cl^-$, $Br^-$, $I^-$, $N_3^-$, $CF_3SO_3^-$, p-$CH_3C_6H_4SO_3^-$, $BF_4^-$, $NO_2^-$, $NO_3^-$, $OH^-$, $PF_6^-$, $BPh_4^-$, $SbF_6^-$, $ClO_4^-$, $OTf^-$, $OTs^-$, an aliphatic carboxylate, an aromatic carboxylate, an alkoxide, and an aromatic oxide; and the other end of the polymer chain of the aliphatic polycarbonate resin is OH.

6. The inorganic particle-dispersed paste composition according to claim 5, wherein the content of the aliphatic polycarbonate resin is from 0.001 to 20 parts by mass, based on 100 parts by mass of the inorganic particles.

7. The inorganic particle-dispersed paste composition according to claim 5 or 6, wherein the inorganic particles are made of at least one member selected from the group consisting of electroconductive particles, ceramic powders, glass powders, and inorganic phosphor particles.

8. An aliphatic polycarbonate resin comprising a constituting unit represented by the formula (1):

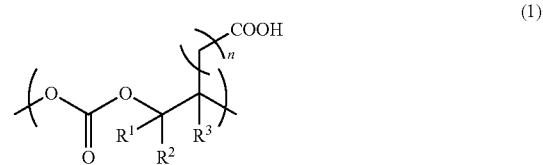

(1)

wherein each of $R^1$, $R^2$ and $R^3$, which may be identical or different, is a hydrogen atom, an alkyl group having from 1 to 10 carbon atoms, or an aryl group having from 6 to 20 carbon atoms; and n is 1 or 2;

wherein one end of a polymer chain of the aliphatic polycarbonate resin is an anionic ligand selected from the group consisting of $F^-$, $Cl^-$, $Br^-$, $I^-$, $N_3^-$, $CF_3SO_3^-$, p-$CH_3C_6H_4SO_3^-$, $BF_4^-$, $NO_2^-$, $NO_3^-$, $OH^-$, $PF_6^-$, $BPh_4^-$, $SbF_6^-$, $ClO_4^-$, $OTf^-$, $OTs^-$, an aliphatic carboxylate, an aromatic carboxylate, an alkoxide, and an aromatic oxide; and the other end of the polymer chain of the aliphatic polycarbonate resin is OH.

9. The aliphatic polycarbonate resin according to claim 8, wherein the content of the constituting unit represented by the formula (1) is from 0.001 to 30% by mol in the entire constituting units constituting the aliphatic polycarbonate resin.

10. The aliphatic polycarbonate resin according to claim 8 or 9, wherein the aliphatic polycarbonate resin further comprises a constituting unit represented by the formula (2):

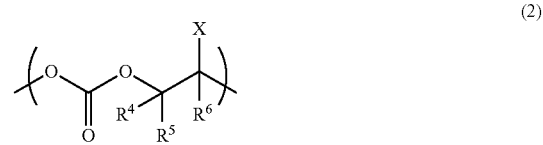

(2)

wherein each of $R^4$, $R^5$, and $R^6$, which may be identical or different, is a hydrogen atom, an alkyl group having from 1 to 10 carbon atoms, or an aryl group having from 6 to 20 carbon atoms; X is a hydrogen atom, an alkyl group having from 1 to 10 carbon atoms, a haloalkyl group having from 1 to 10 carbon atoms, an ether bond-containing group, an ester bond-containing group, or an allyl group.

11. The aliphatic polycarbonate resin according to claim 8, wherein a mass loss percentage after keeping at 160° C. for 1 hour in a thermogravimetric analysis is 90% or more.

* * * * *